(12) United States Patent
Jadidian et al.

(10) Patent No.: US 10,047,610 B2
(45) Date of Patent: Aug. 14, 2018

(54) CERAMIC MATRIX COMPOSITE MATERIALS WITH RARE EARTH PHOSPHATE FIBERS AND METHODS FOR PREPARING THE SAME

(71) Applicant: HONEYWELL INTERNATIONAL INC., Morristown, NJ (US)

(72) Inventors: Bahram Jadidian, Watchung, NJ (US); Eric Passman, Piscataway, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 149 days.

(21) Appl. No.: 14/847,794

(22) Filed: Sep. 8, 2015

(65) Prior Publication Data
US 2017/0067345 A1 Mar. 9, 2017

(51) Int. Cl.
*F01D 5/14* (2006.01)
*D06M 11/46* (2006.01)
(Continued)

(52) U.S. Cl.
CPC ............ *F01D 5/147* (2013.01); *C04B 35/447* (2013.01); *C04B 35/624* (2013.01); *C04B 35/803* (2013.01); *D03D 15/12* (2013.01); *D06M 11/45* (2013.01); *D06M 11/46* (2013.01); *D06M 11/47* (2013.01); *F01D 5/282* (2013.01); *F01D 5/284* (2013.01); *F23R 3/007* (2013.01); *C04B 2235/3217* (2013.01); *C04B 2235/3224* (2013.01); *C04B 2235/3225* (2013.01); *C04B 2235/3227* (2013.01); *C04B 2235/3229* (2013.01); *C04B 2235/3427* (2013.01); *C04B 2235/3463* (2013.01); *C04B 2235/447* (2013.01); *C04B 2235/522* (2013.01); *C04B 2235/5224* (2013.01); *C04B 2235/5228* (2013.01); *C04B 2235/5256* (2013.01);
(Continued)

(58) Field of Classification Search
CPC ...... C04B 2235/3224; C04B 2235/447; C04B 2235/5272; C04B 35/447; C04B 35/624; C04B 35/803; C04B 35/80; D06M 2101/00; D06M 11/45; D06M 11/46; D06M 11/47; F01D 5/147; F01D 5/284; F01D 5/15; F05D 2300/6033; F05D 2300/15; F05D 2300/63; F23R 3/007; D03D 15/12
USPC ........................................................ 428/292.1
See application file for complete search history.

(56) References Cited

U.S. PATENT DOCUMENTS 3,634,286 A * 1/1972 Yates ..................... B01D 71/02
106/286.1
5,665,463 A 9/1997 Morgan et al.
(Continued)

OTHER PUBLICATIONS

Jackson, et al; Compressive creep behavior of an oxide-oxide ceramic composite with monazite fiber coating at elevated temperatures; Materials Science and Engineering: A, Elsevier, vol. 454-455, Apr. 3, 2007.
(Continued)

*Primary Examiner* — Camie S Thompson
(74) *Attorney, Agent, or Firm* — Lorenz & Kopf, LLP

(57) ABSTRACT

Disclosed is a ceramic matrix composite (CMC) material including rare earth phosphate ceramic fibers embedded in a ceramic matrix, wherein the ceramic matrix also optionally includes a rare earth phosphate material. Methods for manufacturing the CMC material and gas turbine engine components formed of the CMC material are also disclosed.

17 Claims, 2 Drawing Sheets

(51) Int. Cl.

| | | |
|---|---|---|
| *D06M 11/47* | (2006.01) | |
| *D06M 11/45* | (2006.01) | |
| *C04B 35/447* | (2006.01) | |
| *C04B 35/624* | (2006.01) | |
| *C04B 35/80* | (2006.01) | |
| *D03D 15/12* | (2006.01) | |
| *F01D 5/28* | (2006.01) | |
| *F23R 3/00* | (2006.01) | |
| *D06M 101/00* | (2006.01) | |

(52) U.S. Cl.
 CPC ............... *C04B 2235/5272* (2013.01); *C04B 2235/616* (2013.01); *D06M 2101/00* (2013.01); *F05D 2240/11* (2013.01); *F05D 2300/15* (2013.01); *F05D 2300/6033* (2013.01)

(56) References Cited

U.S. PATENT DOCUMENTS

| | | | |
|---|---|---|---|
| 5,759,632 A | 6/1998 | Boakye et al. | |
| 6,361,888 B1 | 3/2002 | Kriven et al. | |
| 6,461,415 B1 | 10/2002 | Sambasivan et al. | |
| 6,670,046 B1 | 12/2003 | Xia | |
| 6,709,737 B2 | 3/2004 | Rigali et al. | |
| 6,716,407 B2 | 4/2004 | Davis et al. | |
| 7,201,572 B2 | 4/2007 | Wood et al. | |
| 7,601,425 B2 | 10/2009 | Stoffer et al. | |
| 8,343,589 B2 | 1/2013 | Kirby et al. | |
| 8,425,871 B2 | 4/2013 | Gray et al. | |
| 8,440,108 B2 | 5/2013 | Kirby et al. | |
| 8,501,840 B2 | 8/2013 | Kirby et al. | |
| 8,658,291 B2 | 2/2014 | Kirby et al. | |
| 8,986,779 B2 | 3/2015 | Kirby et al. | |
| 2004/0011245 A1* | 1/2004 | Sambasivan | C23C 4/134 106/14.12 |
| 2006/0110609 A1* | 5/2006 | Eaton | C04B 41/009 428/446 |
| 2010/0069226 A1 | 3/2010 | Meschter | |
| 2010/0081350 A1 | 4/2010 | McCabe et al. | |
| 2010/0151183 A1* | 6/2010 | Davis | B32B 3/30 428/95 |
| 2010/0154422 A1 | 6/2010 | Kirby et al. | |
| 2011/0027467 A1 | 2/2011 | Kirby et al. | |
| 2011/0027556 A1 | 2/2011 | Kirby et al. | |
| 2012/0077004 A1 | 3/2012 | Kirby et al. | |
| 2014/0065292 A1 | 3/2014 | Marshall et al. | |

OTHER PUBLICATIONS

Extended EP Search Report for Application No. 16186718.9-1371 dated Feb. 10, 2017.

EP Communication Under Rule 71(3) EPC for Application No. 16186718.9-1371 dated Jul. 31, 2017.

Bregiroux D., et al. "Sintering and microstructure of rare earth phosphate ceramics REPO4 with Re=La, Ce or Y," Elsevier, 2005.

Warrier K., et al. "Novel Functional and High Temperature Applications of Nanocrystalline Rare Earth Phosphate Coatings and Composites," 2005.

Lucas S., et al. "Rare earth phosphate powders RePO4.nH2O (Re=La, Ce or Y)—Part I. Synthesis and characterization," 2004.

\* cited by examiner

CERAMIC MATRIX COMPOSITE MATERIALS WITH RARE EARTH PHOSPHATE FIBERS AND METHODS FOR PREPARING THE SAME

TECHNICAL FIELD

The present disclosure generally relates to ceramic matrix composite materials and methods for their manufacture. More particularly, the present disclosure provides ceramic matrix composite materials that are composed of, at least as a part of their reinforcing fiber structure, and optionally as part of their matrix structure, one or more rare earth phosphate fibers, and methods for preparing the same.

BACKGROUND

Various industrial applications, including but not limited to the gas turbine engine industry, employ the use of high melting point, lightweight, and creep-resistance materials. One such class of materials that exhibits these properties is ceramic matrix composite (CMC) materials. CMC materials are composed of ceramic fibers embedded in a ceramic matrix. The fibers and matrix may be based on silicon carbides, silicon nitrides, alumina, and/or aluminosilicates, for example.

Despite their advantages, when CMC materials are exposed to temperatures in excess of about 1200° C. in the presence of an oxidizing agent such as water vapor, CMC materials begin to exhibit passive and/or active oxidation and/or degradation. Accordingly, there is a need for improved CMC materials that are better resistant to degradation in oxidizing environments at temperatures in excess of about 1200° C. Furthermore, other desirable features and characteristics of the present disclosure will become apparent from the subsequent detailed description of the disclosure and the appended claims, taken in conjunction with the accompanying drawings and this background of the disclosure.

BRIEF SUMMARY

Disclosed is a ceramic matrix composite (CMC) material including rare earth phosphate ceramic fibers embedded in a ceramic matrix, wherein the ceramic matrix may also contain rare earth phosphate materials. Methods for manufacturing the CMC material and gas turbine engine components formed of the CMC material are also disclosed.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
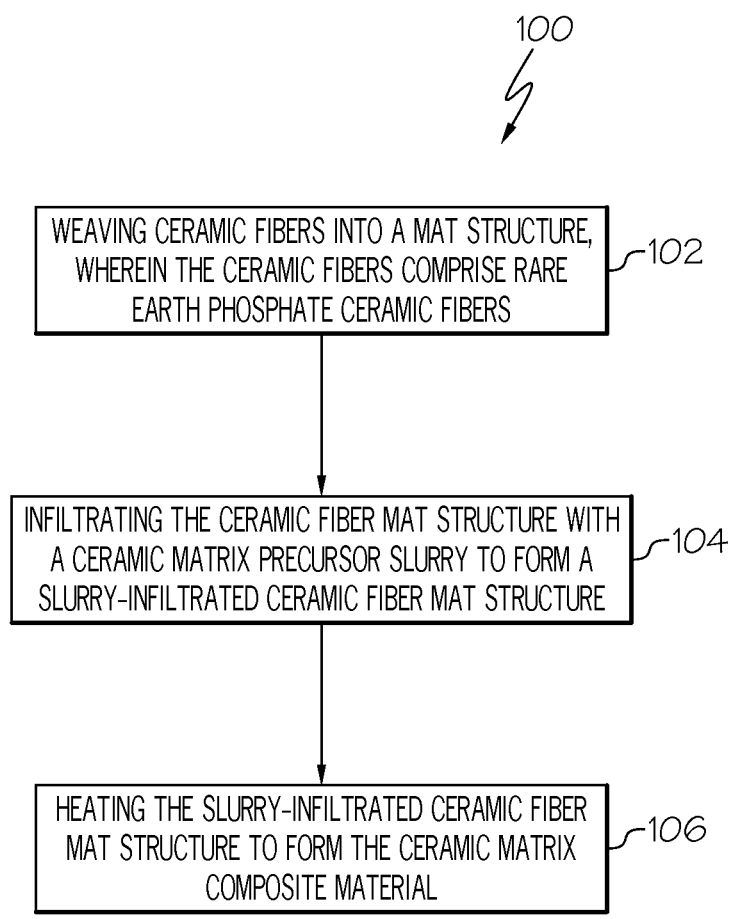
FIG. 1 is a flowchart illustrating a method for manufacturing a ceramic matrix composite material in accordance with some embodiments of the present disclosure.

The following detailed description of the disclosure is merely exemplary in nature and is not intended to limit the disclosure or the application and uses of the disclosure. Furthermore, there is no intention to be bound by any theory presented in the preceding background of the disclosure or the following detailed description of the disclosure.

Ceramic Matrix Composite Material

This disclosure provides a ceramic matrix composite (CMC) material that includes rare earth phosphate ceramic fibers embedded in a ceramic matrix, wherein the ceramic matrix optionally also contains a rare earth phosphate that may be the same or different as the rare earth phosphate ceramic fibers. In some embodiments, rare earth phosphate ceramic fibers compose an entirety of the ceramic fiber composition of the CMC material. In other embodiments, the rare earth phosphate ceramic fibers are present in an amount, based on an overall volume of ceramic fibers in the CMC material, of about 5% to about 95% by volume, such as about 25% to about 75% by volume. The remaining volume fraction of ceramic fibers, if any, may be composed of aluminosilicate or alumina ceramic fibers embedded in the ceramic matrix. The rare earth phosphate ceramic fibers may be ceramic fibers that are made, at least in part, of a material selected from: $LaPO_4$, $YPO_4$, $CePO_4$, $ScPO_4$, $PrPO_4$, $NdPO_4$, $SmPO_4$, $EuPO_4$, $HoPO_4$, $TmPO_4$, $ErPO_4$, $YbPO_4$, $LuPO_4$, $GdPO_4$, $DyPO_4$, $TbPO_4$ and combinations of two or more thereof. In an exemplary embodiment, the rare earth phosphate ceramic fibers include ceramic fibers made, at least in part, of $YPO_4$.

In some embodiments, the ceramic matrix of the CMC material may include ceramic materials such as alumina, aluminosilicate, or aluminum phosphate. In other embodiments, the ceramic matrix may alternatively or additionally include a rare earth phosphate material. In such embodiments where rare earth phosphate materials are additional included, the rare earth phosphate material is present in an amount, based on an overall volume of ceramic matrix in the CMC material, of about 5% to about 95% by volume, such as about 25% to about 75% by volume.

Manufacture of Rare Earth Phosphate Ceramic Fibers

In some embodiments, rare earth phosphate ceramic fibers may be manufactured through the use of a sol-gel process. As used herein, the term sol-gel refers to a wet-chemical technique used for the fabrication of ceramic materials. In this process, the "sol" (or solution) evolves gradually towards the formation of a gel-like network containing both a liquid phase and a solid phase. Typical precursors are rare earth metal alkoxides, rare earth metal chlorides, and rare earth metal nitrates, phosphoric/nitric/hydrochloric acids, which undergo hydrolysis and polycondensation reactions to form a colloid.

The basic structure or morphology of the solid phase can range anywhere from discrete colloidal particles to continuous chain-like polymer networks, and can be appropriately tuned for the formation of ceramic fibers. In both cases (discrete particles or continuous polymer network), the drying process serves to remove the liquid phase from the gel, yielding a micro-crystalline ceramic. With the viscosity of a sol adjusted into a proper range, a ceramic fiber can be drawn as liquid phase is removed from the gel. Subsequent thermal treatment may be performed in order to favor further polycondensation and enhance mechanical properties.

Manufacture of Ceramic Matrix Precursor Slurry

In some embodiments, manufacturing the ceramic matrix precursor slurry includes heat treating an amorphous powder to remove volatile compounds therefrom and to transform the amorphous powder into a crystalline structure powder. The amorphous powder may be an alumina, aluminosilicate, or aluminum phosphate powder, it may be a rare earth phosphate powder, or it may be a combination of both. The amorphous powder may be obtained using a sol-gel process as described above. In any case, manufacturing the slurry further includes milling the crystalline structure powder to reduce a size of crystals in the crystalline structure powder. In some embodiments, milling may be performed using ball milling or attrition milling, for example. Still further, manufacturing the ceramic matrix precursor slurry further includes mixing the crystalline structure powder with one or more suitable binders and/or dispersants, and one or more (preferably non-aqueous) solvents, to form the ceramic matrix precursor slurry.

Manufacture of Ceramic Matrix Composite Material

A method 100 for manufacturing a ceramic matrix composite material is illustrated with reference to FIG. 1. In some embodiments, manufacturing the ceramic matrix composite material includes a step 102 of weaving ceramic fibers into a mat structure, wherein the ceramic fibers include the rare earth phosphate ceramic fibers described above. Weaving the fibers may be accomplished using various ceramic fiber weaving apparatuses as are commercially available. Manufacturing the ceramic matrix composite material also includes a step 104 infiltrating the ceramic fiber mat structure with the ceramic matrix precursor slurry, as described above, to form a slurry-infiltrated ceramic fiber mat structure. In some embodiments, infiltration may be performed at a reduced pressure, i.e., a pressure less than standard atmospheric pressure, to assist the slurry in infiltrating the fiber mat structure. Further, manufacturing the ceramic matrix composite material includes a step 106 of heating the slurry-infiltrated ceramic fiber mat structure to form the CMC material. In some embodiments, heating may be performed at temperatures at or above about 1000° C. Further, heating may be performed for a period of time from 1 hour to 1 or more days.

Gas Turbine Engine

Figure 2:
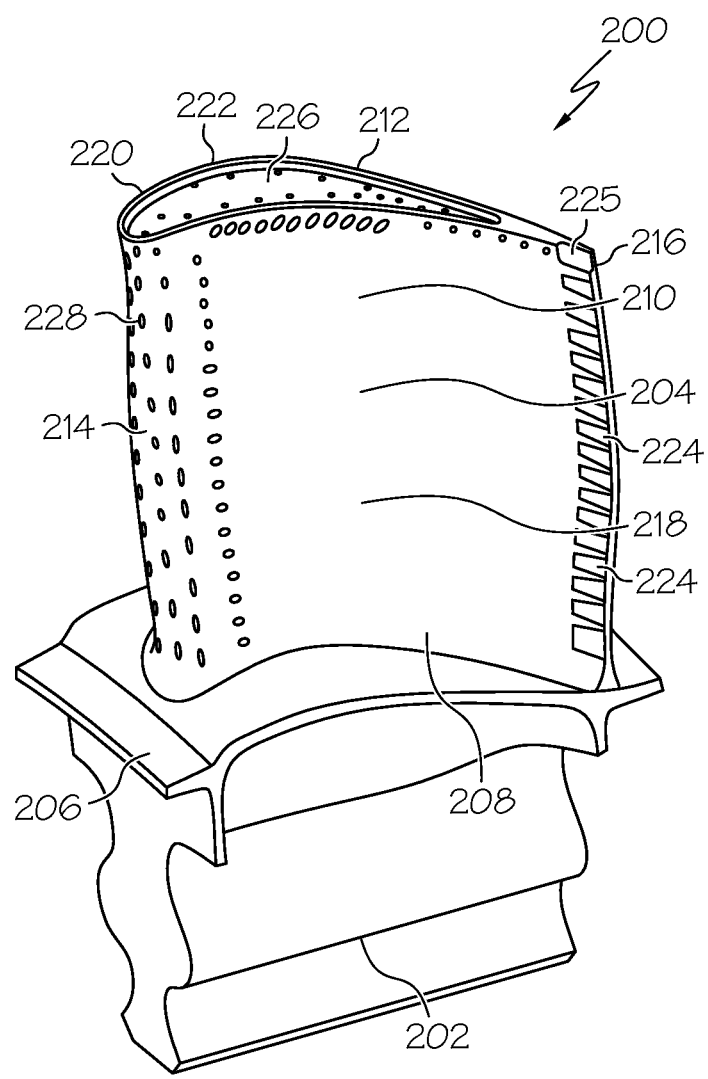
FIG. 2 is an exemplary gas turbine engine component formed at least in part of a ceramic matrix composite material in accordance with some embodiments of the present disclosure.

The present disclosure is also directed to a gas turbine engine that includes a gas turbine engine component, wherein the gas turbine engine component is formed of a ceramic matrix composite (CMC) material, and wherein the CMC material includes rare earth phosphate ceramic fibers embedded in a ceramic matrix. In some embodiments, the gas turbine engine component may be a blade, a vane, a nozzle, duct, or a combustion liner. FIG. 2 illustrates an exemplary gas turbine engine component embodied as a blade 200. The blade 200 includes a blade attachment section 202, an airfoil 204, and a platform 206. The blade attachment section 202 provides an area in which a shape is machined. In an embodiment, the shape corresponds with a shape formed in a respective blade attachment slot (not shown) of the turbine hub. For example, in some embodiments, the shape may be what is commonly referred to in the art as a "firtree" shape. In other embodiments, the shape may be a beveled shape. However, in other embodiments, any one of numerous other shapes suitable for attaching the blade 200 to the turbine may be alternatively machined therein.

The airfoil 204 has a root 208 and two outer walls 210, 212. The root 208 is attached to the platform 206 and each outer wall 210, 212 has outer surfaces that define an airfoil shape. The airfoil shape includes a leading edge 214, a trailing edge 216, a pressure side 218 along the first outer wall 210, a suction side 220 along the second outer wall 212, a tip outer wall 222, a plurality of pressure side discharge trailing edge slots 224 (the edge slot at the tip is the tip trailing edge slot 225), a tip plenum 226 recessed radially inward from the tip outer wall 222, and a series of holes 228 (commonly referred to in the art as "buick" holes). Holes 228 may be provided along the leading edge 214, along the first outer wall 210 near the tip outer wall 222, and/or along the tip plenum 226. Though not shown in FIG. 2, the blade 200 may have an internal cooling circuit formed therein, which may extend from an opening in the platform 206 through the blade 200 and may include various passages that eventually communicate with the plurality of trailing edge slots 224 and the tip trailing edge slot 225, or other openings (not shown) that may be formed in the blade 200. In particular, the convex suction side wall 212, the concave pressure side wall 210, and the tip 222 each include interior surfaces defining the internal cooling circuit.

In some embodiments, the blade 200 may be made, in whole or in part, of a rare earth phosphate ceramic fiber-containing ceramic matrix composite material, as described above. Moreover, the blade 200 may include an insulating material layer overlying the CMC material. An exemplary insulating material may include an assemblage of hollow spheres such as mullite, alumina or zirconia); an oxide particulate filler (mullite, alumina, zirconia, rare earth oxides, rare earth phosphates, for example); and a bonding material that may be aluminum phosphate ($AlPO_4$), and rare earth phosphates. Further, the blade 200 may include a protective outer coating, such as an environmental barrier coating. The protective outer coating may include, for example, materials that resist interaction with water vapor at high temperatures, such as zirconia, yttrium zirconate, ytterbium zirconate, lutetium zirconate, aluminate, yttrium silicates, yttrbium silicates, lutethium silicates, scandium silicates or xenotime phase rare earth phosphates.

Accordingly, the present disclosure has provided a ceramic matrix composite (CMC) material including rare earth phosphate ceramic fibers embedded in a ceramic matrix, wherein the ceramic matrix optionally includes a rare earth phosphate that may be the same or different as the ceramic fibers. The disclosed CMC material beneficially resists oxidation and/or degradation at temperatures in excess of about 1200° C. The disclosed CMC material is suitable for use in industrial applications, such as the manufacture of components of a gas turbine engine.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure, it being understood that various changes may be made in the function and arrangement of elements described in an exemplary embodiment without departing from the scope of the disclosure as set forth in the appended claims and their legal equivalents.

What is claimed is:

1. A ceramic matrix composite (CMC) material comprising rare earth phosphate ceramic fibers consisting of $YPO_4$ or $YbPO_4$ embedded in a ceramic matrix, wherein the ceramic matrix comprises a rare earth phosphate material.

2. The CMC material of claim 1, wherein the rare earth phosphate ceramic fibers are present in an amount, based on an overall volume of ceramic fibers in the CMC material, of about 5% to about 95% by volume.

3. The CMC material of claim 1, further comprising ceramic fibers consisting of aluminosilicate or alumina embedded in the ceramic matrix.

4. The CMC material of claim 1, wherein the ceramic matrix further comprises alumina, aluminosilicate, aluminum phosphate, or rare earth silicates.

5. The CMC material of claim 1, wherein the rare earth phosphate material is present in an amount, based on an overall volume of ceramic matrix in the CMC material, of about 5% to about 95% by volume.

6. A method for manufacturing a ceramic matrix composite (CMC) material comprising the steps of:
weaving ceramic fibers into a mat structure, wherein the ceramic fibers comprise rare earth phosphate ceramic fibers;
infiltrating the ceramic fiber mat structure with a ceramic matrix precursor slurry to form a slurry-infiltrated ceramic fiber mat structure; and
heating the slurry-infiltrated ceramic fiber mat structure to form the CMC material.

7. The method of claim 6, further comprising the step of manufacturing the ceramic fibers prior to the step of weaving the ceramic fibers.

8. The method of claim 7, wherein the step of manufacturing the ceramic fibers is performed using a sol-gel process.

9. The method of claim 6, wherein the step of weaving ceramic fibers comprises weaving ceramic fibers that consist of a material selected from the group consisting of: $LaPO_4$, $YPO_4$, $CePO_4$, $ScPO_4$, $PrPO_4$, $NdPO_4$, $SmPO_4$, $EuPO_4$, $HoPO_4$, $TmPO_4$, $ErPO_4$, $YbPO_4$, $LuPO_4$, $DyPO_4$, $TbPO_4$, $GdPO_4$ and combinations of two or more thereof.

10. The method of claim 6, further comprising the step of manufacturing the ceramic matrix precursor slurry prior to the step of infiltrating the ceramic fiber mat structure.

11. The method of claim 10, wherein the step of manufacturing the ceramic matrix precursor slurry comprises the sub-steps of:
heat treating an amorphous powder to remove volatile compounds therefrom and to transform the amorphous powder into a crystalline structure powder;
milling the crystalline structure powder to reduce a size of crystals in the crystalline structure powder; and
mixing the crystalline structure powder with a binder or dispersant to form the ceramic matrix precursor slurry.

12. The method of claim 11, wherein the sub-step of heat treating the amorphous powder comprises heat treating a rare earth phosphate ceramic amorphous powder.

13. The method of claim 6, wherein the step of heating the slurry-infiltrated ceramic fiber mat structure comprises heating at or above about 1000° C.

14. A gas turbine engine comprising a gas turbine engine component, wherein the gas turbine engine component is formed at least in part of a ceramic matrix composite (CMC) material, and wherein the CMC material comprises rare earth phosphate ceramic fibers consisting of $YPO_4$ or $YbPO_4$ embedded in a ceramic matrix.

15. The gas turbine engine of claim 14, wherein the gas turbine engine component is selected from the group consisting of: a blade, a vane, a nozzle, a duct, and a combustion liner.

16. The gas turbine engine of claim 14, wherein the gas turbine engine component further comprises an insulating material layer overlaying the CMC material, and wherein the insulating material layer comprises a rare earth phosphate ceramic material.

17. The gas turbine engine of claim 16, wherein the gas turbine engine component further comprises protective outer coating overlaying the insulating material layer.

* * * * *